US008206230B2

(12) United States Patent
Magpuri

(10) Patent No.: US 8,206,230 B2
(45) Date of Patent: Jun. 26, 2012

(54) CIRCULAR MOTION THEATER

(75) Inventor: Cecil D. Magpuri, Windermere, FL (US)

(73) Assignee: Falcon's Treehouse, L.L.C., Orlando, FL (US)

( * ) Notice: Subject to any disclaimer, the term of this patent is extended or adjusted under 35 U.S.C. 154(b) by 0 days.

(21) Appl. No.: 13/027,159

(22) Filed: Feb. 14, 2011

(65) Prior Publication Data

US 2011/0214359 A1    Sep. 8, 2011

Related U.S. Application Data

(63) Continuation of application No. 11/677,922, filed on Feb. 22, 2007, now abandoned.

(60) Provisional application No. 60/776,025, filed on Feb. 23, 2006.

(51) Int. Cl.
*A63G 31/16* (2006.01)
*G09B 9/08* (2006.01)

(52) U.S. Cl. ............... 472/60; 472/61; 472/130; 434/55

(58) Field of Classification Search ............. 472/59–61, 472/75–78, 130, 136; 434/29, 55, 56, 57, 434/64, 69
See application file for complete search history.

(56) References Cited

U.S. PATENT DOCUMENTS

| | | | |
|---|---|---|---|
| 2,304,434 A | | 12/1942 | Ayres |
| 3,758,714 A | * | 9/1973 | Herndon ......................... 348/38 |
| 4,976,438 A | * | 12/1990 | Tashiro et al. .................. 463/34 |
| 5,499,920 A | * | 3/1996 | Trumbull ......................... 434/69 |
| 6,074,307 A | * | 6/2000 | Hettema et al. ................. 472/77 |
| 6,224,491 B1 | * | 5/2001 | Hiromi et al. ................... 472/59 |
| 6,280,341 B1 | * | 8/2001 | Hayashi .......................... 472/61 |
| 6,533,670 B1 | * | 3/2003 | Drobnis .......................... 472/60 |

FOREIGN PATENT DOCUMENTS

| | | |
|---|---|---|
| WO | 9201132 | 1/1992 |
| WO | 9848912 | 11/1998 |
| WO | 9849599 | 11/1998 |

OTHER PUBLICATIONS

Japanese Patent Office, Office Action and English Translation for JP 2008-556538, dated Feb. 13, 2012.

* cited by examiner

*Primary Examiner* — Kien Nguyen

(74) *Attorney, Agent, or Firm* — Perkins Coie LLP

(57) ABSTRACT

An entertainment structure and apparatus principally comprising a 360-degree 2D and/or 3D cinematic theater. Seating for audience members is arrangeable on a circular motion base platform. A compound curved screen may lower from above to surround the theater upon a circular motion base platform, providing seamless media. A 2D/3D projection system is oriented within the structure to provide 2D/3D images on the screen through projection overlap for edge blending. A control system is used to rotate, pitch and roll the motion base platform. The control system can be synchronized with the media presentation. The structure includes a number of variations such as a variety of seating orientations, a stationary screen, a variety of screen configurations, and modular tracking seating.

14 Claims, 24 Drawing Sheets

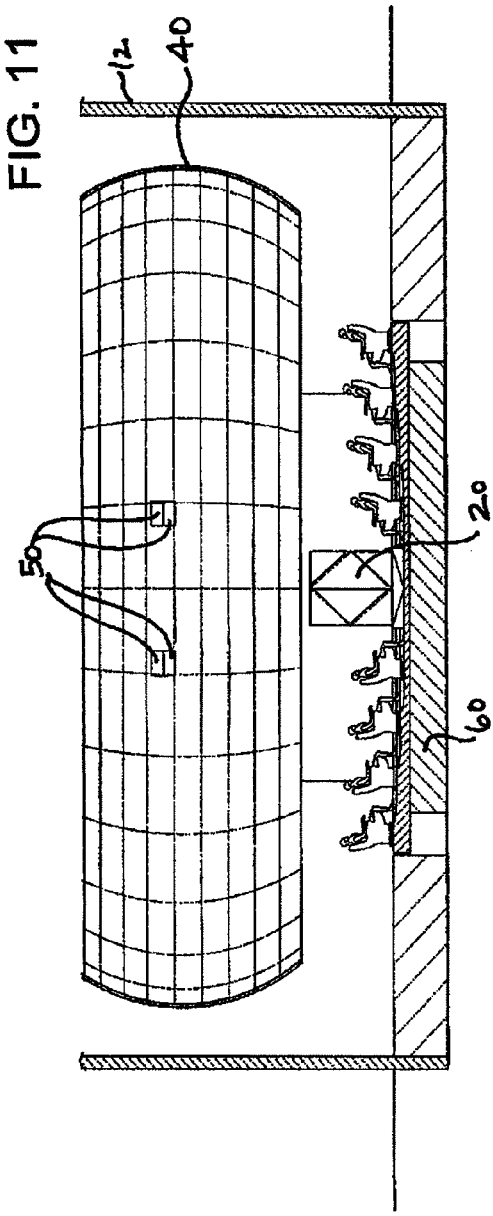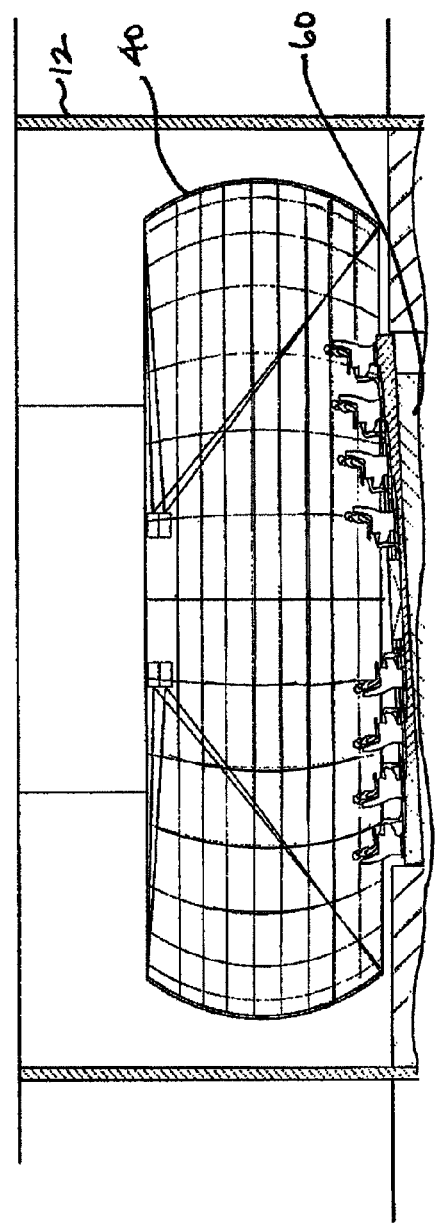

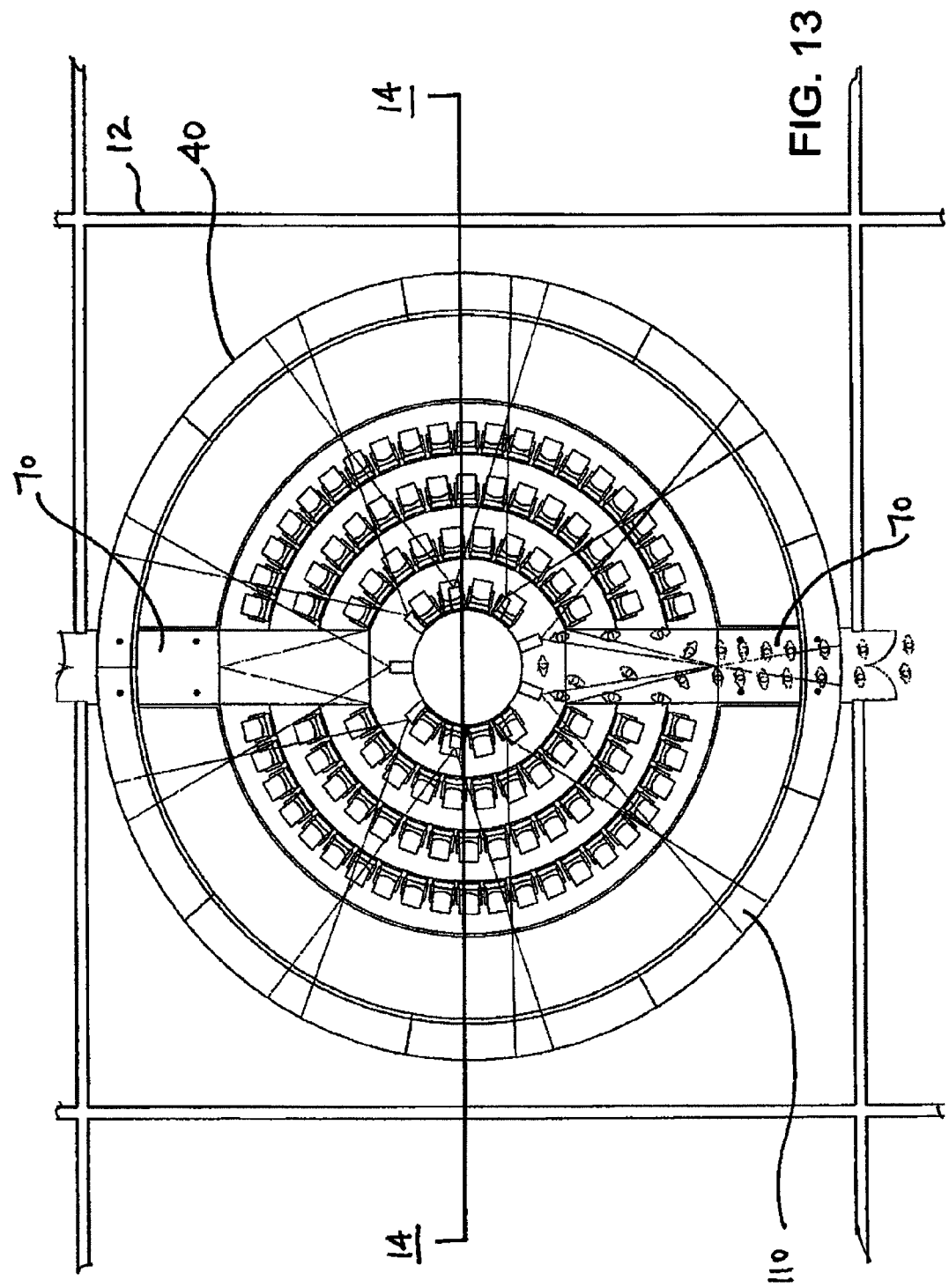

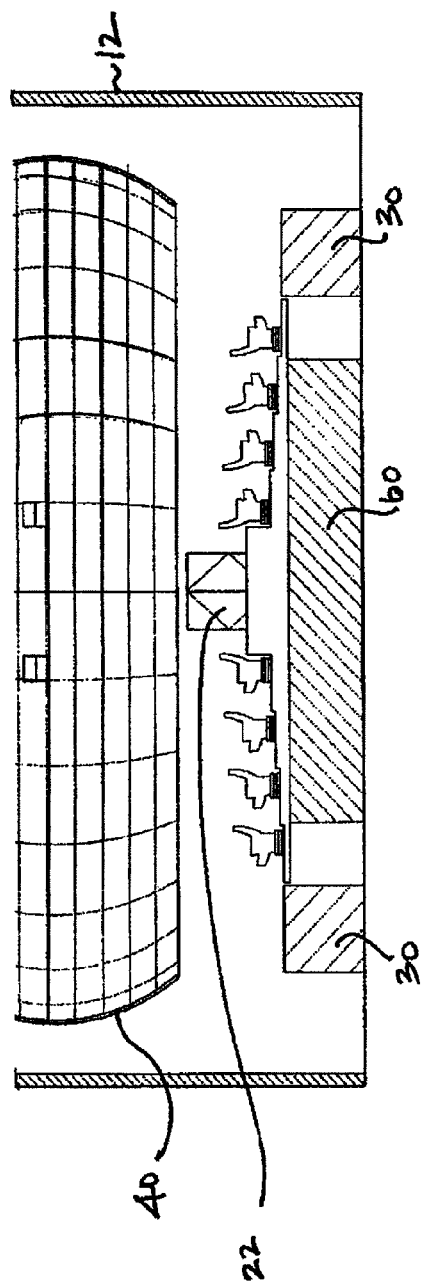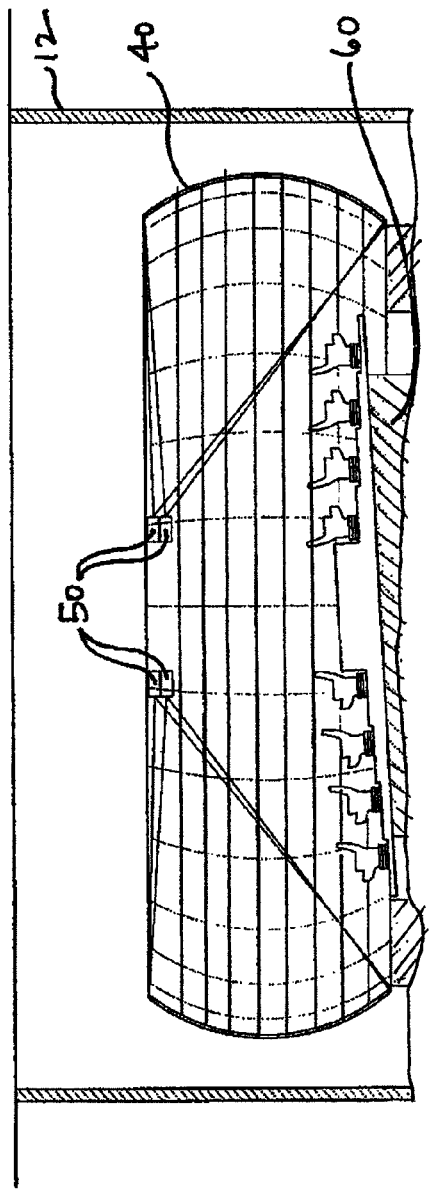

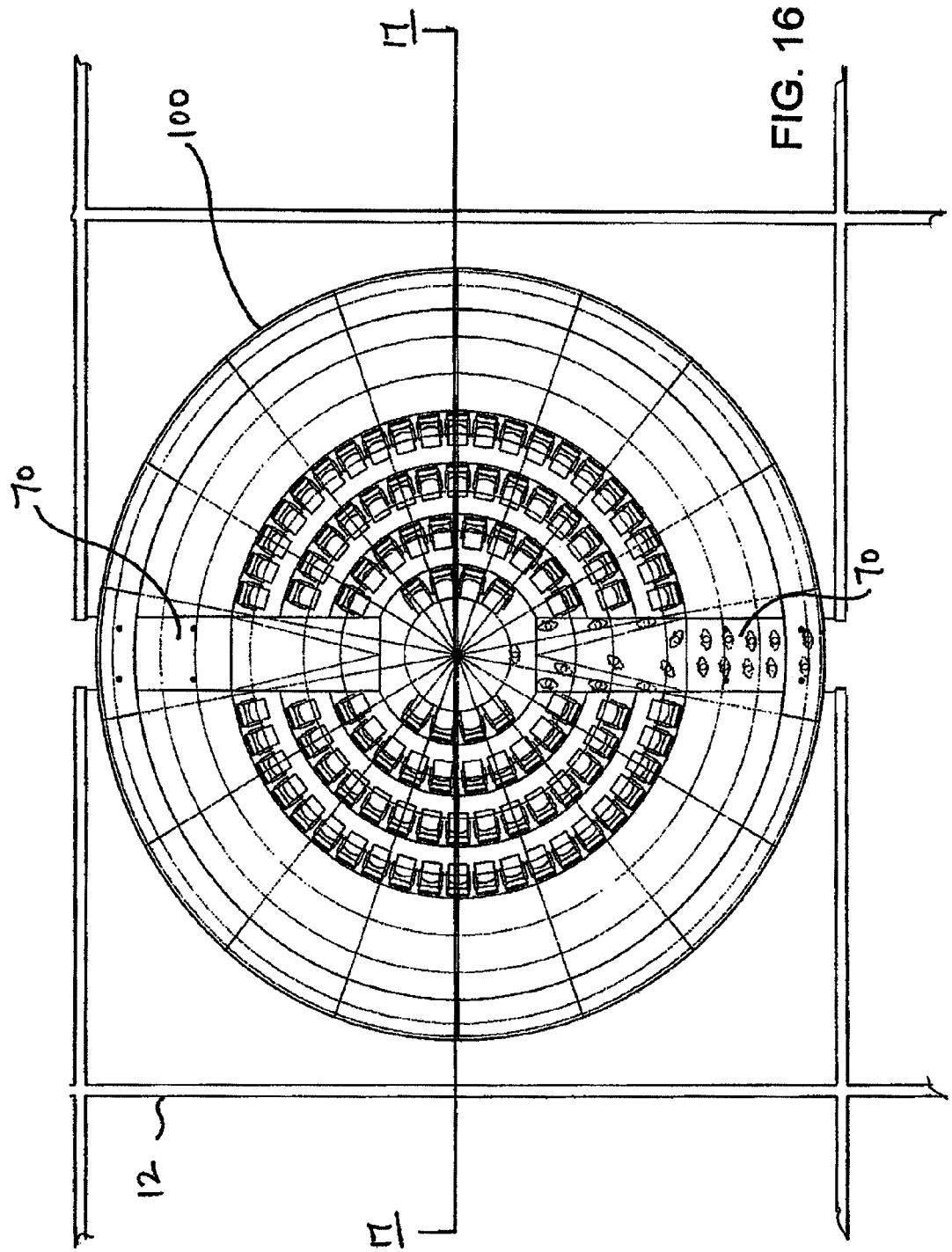

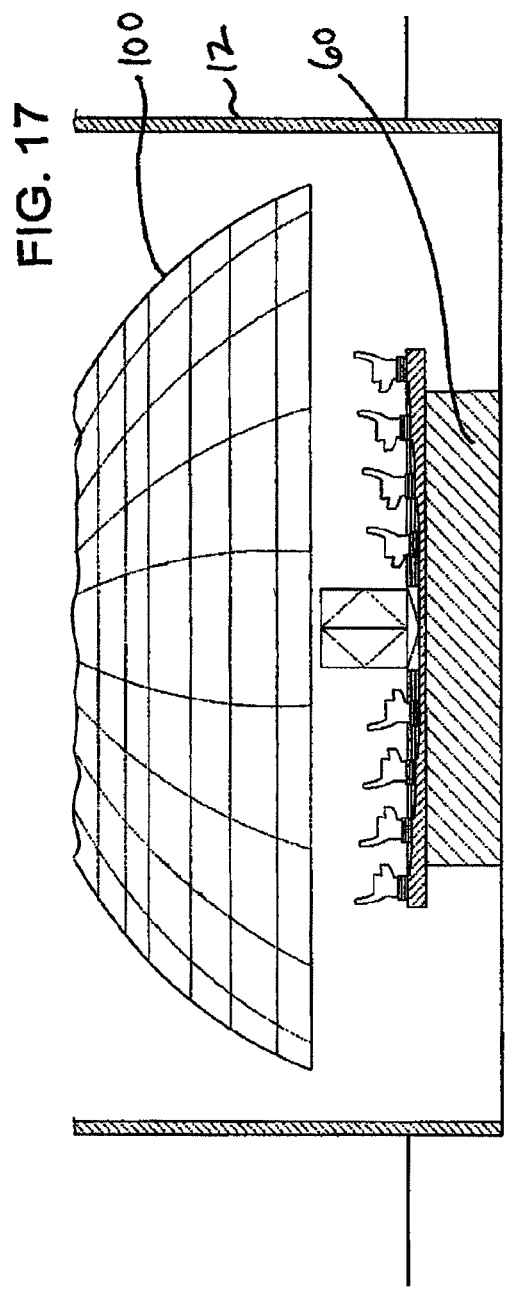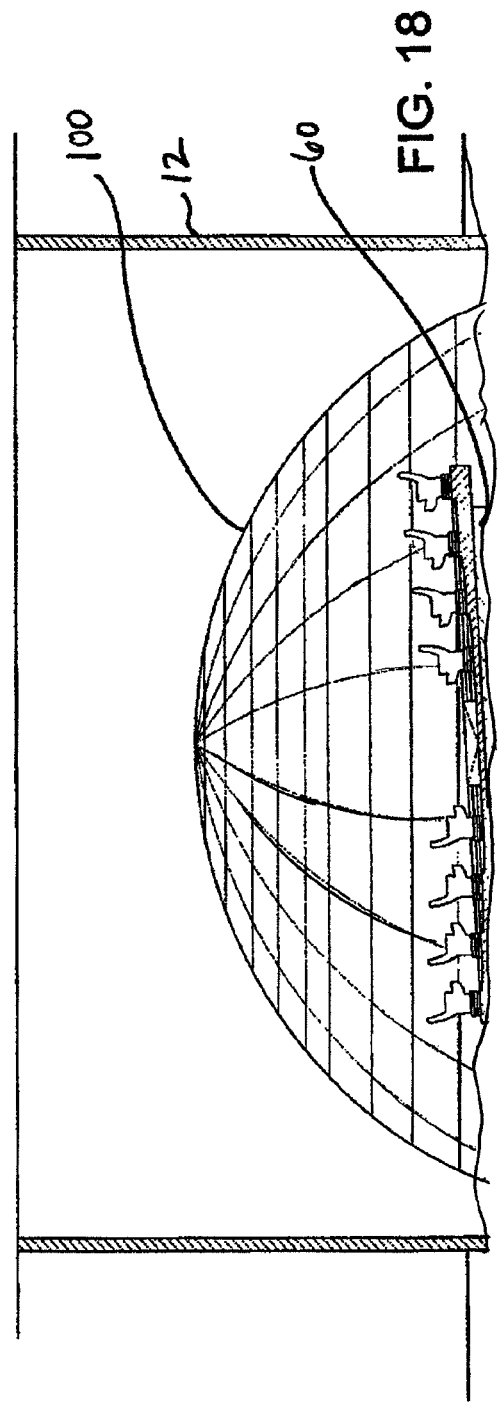

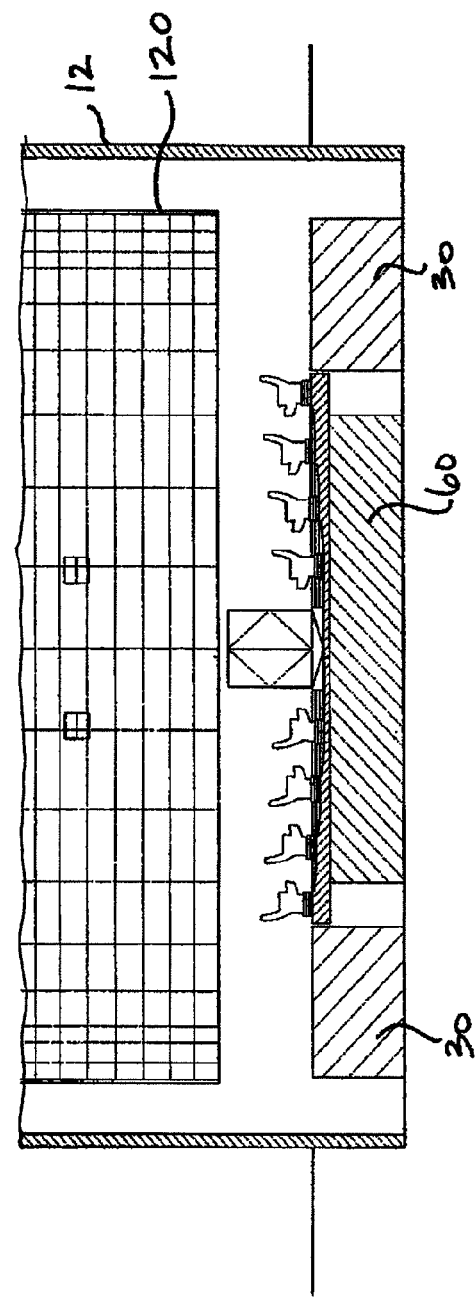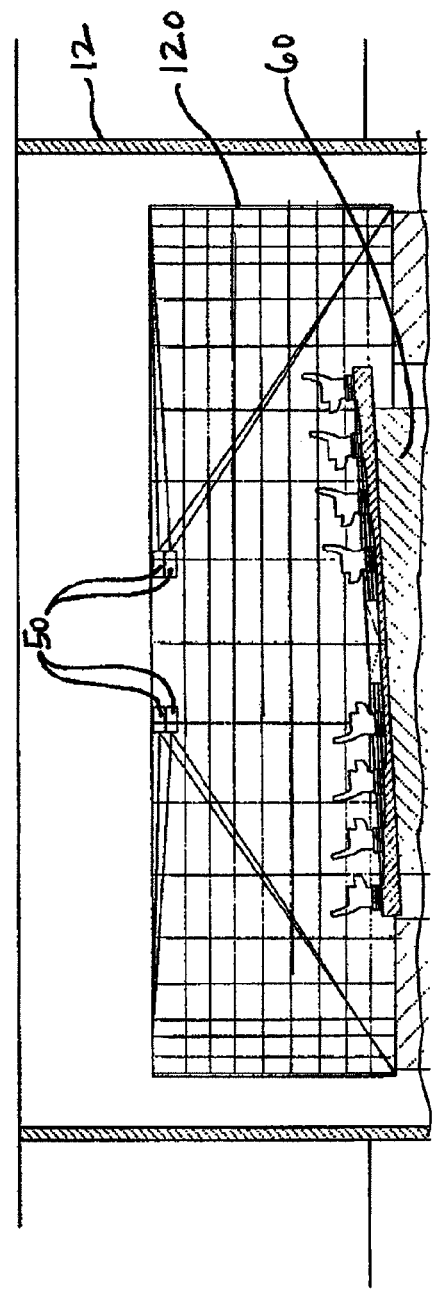

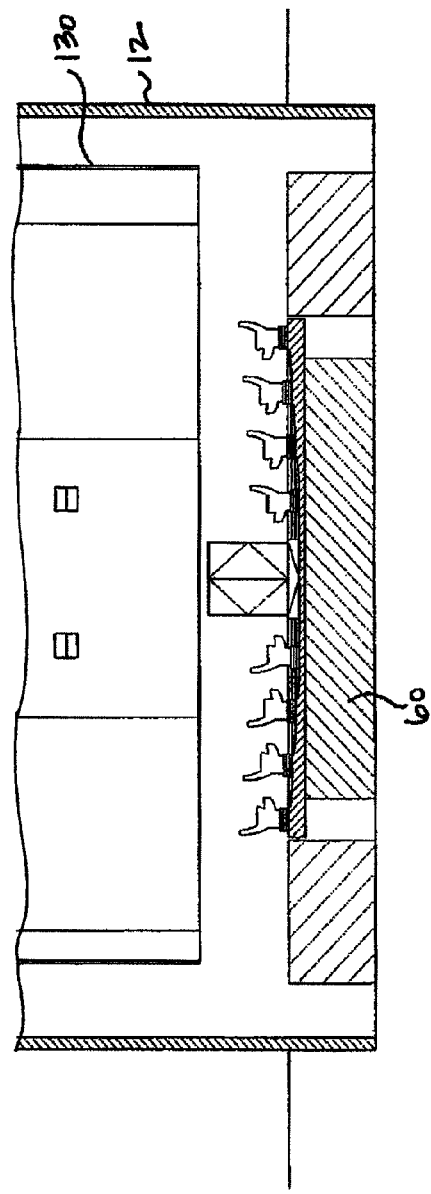
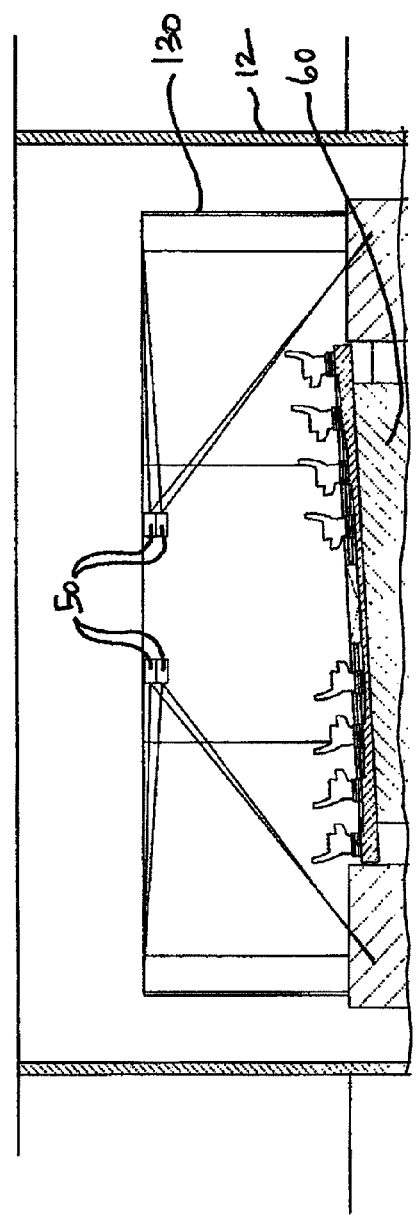

CIRCULAR MOTION THEATER

CROSS-REFERENCE TO RELATED APPLICATIONS

This application is a continuation application of U.S. patent application Ser. No. 11/677,922, filed Feb. 22, 2007, which claims the benefit of U.S. Provisional Patent Application No. 60/776,025, filed Feb. 23, 2006, both of which are incorporated herein by reference.

TECHNICAL FIELD

This invention relates generally to cinematic theaters, and more particularly to structures providing sensory immersion in a motion picture presentation.

BACKGROUND

Traditionally, cinematic theaters have a stationary screen and stationary seating facing toward the screen. Circular or polygonal theaters are known, especially for live stage productions, where the audience surrounds a stage.

Cinematic theaters having a round or polygonal shape and a dome shaped screen are also known. In these theaters, the audience is generally seated in stationary seats and the screen is viewed above and around them.

Also known in the art are various simulator structures, for both training purposes and entertainment. For driving and flight training, for example, the structure may include a steering wheel, joystick or other mechanism for interacting with the screen display. In an entertainment setting, the seating platform may include 1-6 DOF (degree of freedom) movement.

It is thus desirable to provide an improved theatrical experience including enhanced sensory immersion.

SUMMARY

An entertainment structure in the form of a cinematic theater has an exterior formed in any shape, based on the specific application of the theater and the creative content of the media. The interior of the structure will generally be essentially a circular or near circular configuration (including oval or polygonal shapes). Members of an audience may enter across a walkway, which may be retracted before the cinematic presentation begins. Alternatively, the audience may be mechanically moved into the theater on seating (or standing) platforms.

Initially, the audience members may have no indication that they are in a motion base theater. Instead, their surroundings give the impression that the structure is a typical stationary theater. The screen may substantially or entirely encircle the audience seating, providing continuous 360-degree+image viewing. The screen may be cylindrical, have compound curvature, or be made of flat adjacent or adjoining sections. The screen may be moveable relative to the seating. For example, the screen may be moveable from a raised position, when the audience enters and exits the theater, to a lowered position during the cinematic presentation.

Seating for members of an audience may be provided on a circular motion base platform. The seats may be equipped with seat restraints, such as seat belts, as well as a variety of special effects such as scent, neck blast, wind blast, leg tickler and seat rumble. The screen is provided at least partially around the audience seating. In one design, the screen has an arc of approximately 360 degrees. The screen may be lowered from above to surround the seating on the motion base platform, providing seamless media. A 2D and/or 3D projection system is oriented within the structure to project images on the screen. Alternatively, other non-projecting image forming techniques may be used, such as having the screen itself generate the images, for example via LCD, plasma, DLP, etc.

An electronic control system may be used to move the motion base. Various movements, or combinations of movements may be used. These include rotate, pitch and roll. Heave, surge and yaw may also be used. The electronic control system may be synchronized with the sound and the projected media to give the viewer a vivid sensation of being completely immersed in the action on the screen, as if being there. The system may include a number of variations including a variety of seating orientations, a stationary screen, a variety of screen configurations, and modular tracking seating.

The theater can be designed to provide sensations which simulate a specific entertainment or educational experience. The theater may create the initial impression of a standard non-motion base theater, thus providing an element of surprise when the seating area begins to move. Synchronized motion may be provided for the audience while subjecting the audience to visual, visceral, tactile and audible sensations which simulate immersion in a particular environment, storyline, experience, and/or action.

An entertainment structure or theater may have a motion base platform on which seating for members of an audience is arrangeable and equipped with special effects; support means on which the motion base platform is rotatably mounted; orientation varying means operable to tilt, pitch and roll the motion base platform from the horizontal in a required direction; and drive means operable to rotate said motion base platform. A drive system is operable to actuate said orientation varying means. A walkway may be provided for spectator access to the motion base platform.

A compound curved 360 degree movable screen; a 2D/3D projection system with projection overlap for edge blending; and control means operable to control actuation of screens, may be used. The projection overlap may be from about %15 to %30. Special effects may also be used.

In one design, the support platform is rotatably mounted and also tiltable in any direction by a motion base system. The base pitch is approximately 3 DOF (degrees of freedom) (1 to 6 degrees) and the base rotation is approximately 1 to 12 RPM. In such arrangement, there may be reversible drive means for reversibly rotating the motion base platform. The seating upon the motion base platform may include any number and may be arranged in any configuration, including an orientation in which the seats face inwardly, toward the center of the theater, (with each seat providing a nominal front facing sight line aligned on a radius). The seats may also correspondingly face outwardly from the center. The seating arrangement may also range in circumference from 180 degrees to 360 degrees and all variations between.

The motion base platform may be modular in configuration with two to twelve separate tracked sections or 4 to 28 seat "vehicles" that are equipped with the function of rotating out of the circular configuration and moving out of the theater along a tracked system.

The seats in the theater can be equipped with seat restraints designed to safely accommodate the specific requirements and needs of the presentation. Additionally, the seats themselves can be equipped with a variety of effects including, scent, neck blast, wind blast, leg tickler and seat rumble.

A scissor lift, elevator, drawbridge, or similar walkway may be located at one location or at two or more locations of the theater, to provide access for audience into the theater. The walkway can be moved into position when needed to allow audience members to walk onto the motion base theater platform. The walkway is then removed or withdrawn during the show, to avoid interfering with movement of the motion base. In designs having limited movement, fixed and flexible walkways may be used. The locations and number of walkways used may be varied, as the type, number and location of the walkways is not essential to the theater. In the stationary screen configuration, the walkway(s) is not needed.

The motion base theater described may be used for cinematic entertainment and educational purposes. It may include a 360-degree compound curved screen extending upwardly from a position adjacent to the motion base platform. The screen may be hidden in a ceiling mount. At the appropriate time, the screen may be lowered into position within and/or around the motion base platform. When the presentation is ended the screen may be raised and restored to its original position.

The screen may also be stationary, with corresponding reductions in seating to accommodate ingress and egress. Additionally, the screen may be in the shape of a spherical dome or a cylinder, with appropriate adjustments in screen lowering and lifting speeds. The motion base platform may also be surrounded by an arrangement of 5 to 17 or more flat projection screens, which may raise and lower.

The 2D and/or 3D media projector or projector systems may be mounted for movement with the motion base platform, during reversible rotation of the platform. The movement of the motion base platform is advantageously synchronized with the action of the media projection so as to heighten the perception of audience members of movement otherwise perceived only visually and aurally. Additionally, the 2D and/or 3D projection system may be oriented within the structure to project images on the screen or screens by utilizing e.g., 15%, 20%, 25%, or 30% projection overlap to create a seamless, edge-blended 360-degree image or images.

The theater may also further include an electronic or computer controller operable to integrate movement of the motion base platform with action on the screen. The controller may be operable to control operation of the drive means affecting reversible rotation, and the drive system for providing tilt, pitch and roll the motion base platform about its vertical axis in all 360 degrees. The controller may be operable independently of, but in synchronization with, the media presentation being viewed.

Alternately, the controller may be operatively integrated with the media presentation, and operable in response to a signal or signals embedded in the media or emanating from the projection system. Most conveniently, the controller includes a microprocessor for which, in either case, the projector or projector system is cued by the microprocessor. The electronic control system thus may be synchronized with the sound and the projected media to give the viewer a vivid sensation of being completely immersed in the action on the screen, as if being there.

In one form, the entertainment structure may have surround sound audio components with a multi-channel system including a respective speaker unit on each channel of the system. Speakers may be mounted for the optimal level of audience immersion. In use, the speaker system typically may be placed in a central location, with each speaker unit facing so as to direct its output in the respective direction toward an opposed wall surface so as to rebound from the latter.

BRIEF DESCRIPTION OF THE DRAWINGS

In the drawings, wherein the same reference number indicates the same element throughout the several views:

FIG. 4 is a plan view of the second theater embodiment.

FIG. 5 is a section view taken along line 5-5 of FIG. 4 and showing the theater in a loading/unloading position.

FIG. 6 is a section view taken along line 5-5 of FIG. 4 and showing the theater in a show position.

FIG. 7 is a plan view of the third motion base theater embodiment.

FIG. 8 is a section view taken along line 8-8 of FIG. 7 and showing the theater in a show position.

FIG. 9 is a section view taken along line 8-8 of FIG. 7 and showing the projection and the movement of the seats on the motion base.

FIGS. 10-12 show a fourth embodiment of a motion base theater, with a separate entrance and exit, and having an octagonal outer structural shape.

FIG. 10 is a plan view of the fourth motion base theater embodiment.

FIG. 11 is a section view taken along line 11-11 of FIG. 10, showing the theater in a loading/unloading position.

FIG. 12 is a section view taken along line 11-11 of FIG. 10, showing the theater in a show position and showing movement of the seats on the motion base.

FIGS. 13-15 show a fifth motion base theater embodiment similar to the theater shown in FIGS. 10-12, but with the seats facing outwardly, towards the screen, rather than inwardly, towards each other. The description of FIGS. 13-15 otherwise corresponds to the description of FIGS. 10-12.

FIGS. 16-18 show a sixth motion base theater embodiment having a dome screen moveable vertically from a loading/unloading position to a show position. The seats are shown facing inwardly towards the center of the theater.

FIG. 16 is a plan view of the sixth motion base theater embodiment.

FIG. 17 is a section view taken along line 17-17 of FIG. 16 and showing the theater in a loading/unloading position.

FIG. 18 is a section view taken along line 17-17 of FIG. 16, showing the theater in a show position and showing movement of the seating on the motion base.

FIGS. 19-21 show a seventh motion base theater embodiment having a cylinder screen moveable vertically from a loading/unloading position to a show position. The seats face inwardly. The description of FIGS. 19-21 is otherwise the same as the description of FIGS. 10-12.

FIG. 22 is a plan view of the eighth motion base theater embodiment.

FIG. 23 is a section view taken along line 23-23 of FIG. 22.

FIG. 24 is a section view taken along line 23-23 of FIG. 22, showing the projection and showing movement of the seating on the motion base.

FIGS. 25-27 show a ninth embodiment of a motion base theater having a projection screen formed of flat segments. The projection screen is moveable from a loading/unloading position to a show position. The seats face inwardly. The description of FIGS. 25-27 is otherwise the same as the description of FIGS. 10-12.

FIG. 28 is a plan view of the eleventh motion base theater embodiment.

FIG. 29 is a section view taken along line 29-29 of FIG. 28 showing the theater in a loading/unloading position with the audience still situated above the theater.

FIG. 30 is a section view taken along line 29-29 of FIG. 28 and showing the theater in a show position with the audience in place.

DETAILED DESCRIPTION OF THE DRAWINGS

In each of the embodiments described below, the seats are supported on a motion base. The motion base typically can provide pitch, roll, and yaw movement. In some designs, only one or two of these movements may be used. In other designs, these three movements may be used along with other movements as well. Three hundred sixty degree+rotation movement may also be provided. Multiple separate smaller motion bases may be used in place of a single larger motion base. Multiple projectors within the theater may be used to provide seamless edge blended images. The movement of the images on the screen generally will be choreographed or synchronized with the movement of the theater seating on the motion base.

Any of the features or elements in any of the embodiments illustrated may be used with or in any other embodiment. For example, the seating in any of the embodiments shown may face inwardly or outwardly. The projection screen may form a continuous 360 degree cylinder wall, dome, or compound curved structure, or the screen may extend only partially around the seating. The screen may also be flat and formed of segments forming a polygonal shape, which may be raised and lowered separately. The seating may be provided in concentric or non-concentric rows forming almost complete circles or semi-circles. While the seating positions are generally aligned with radii of the theater, the seating may also be oriented at other angles, including parallel seating, i.e., with substantially all of the seats facing the same direction (and with the seats having generally parallel view lines).

Figure 1:
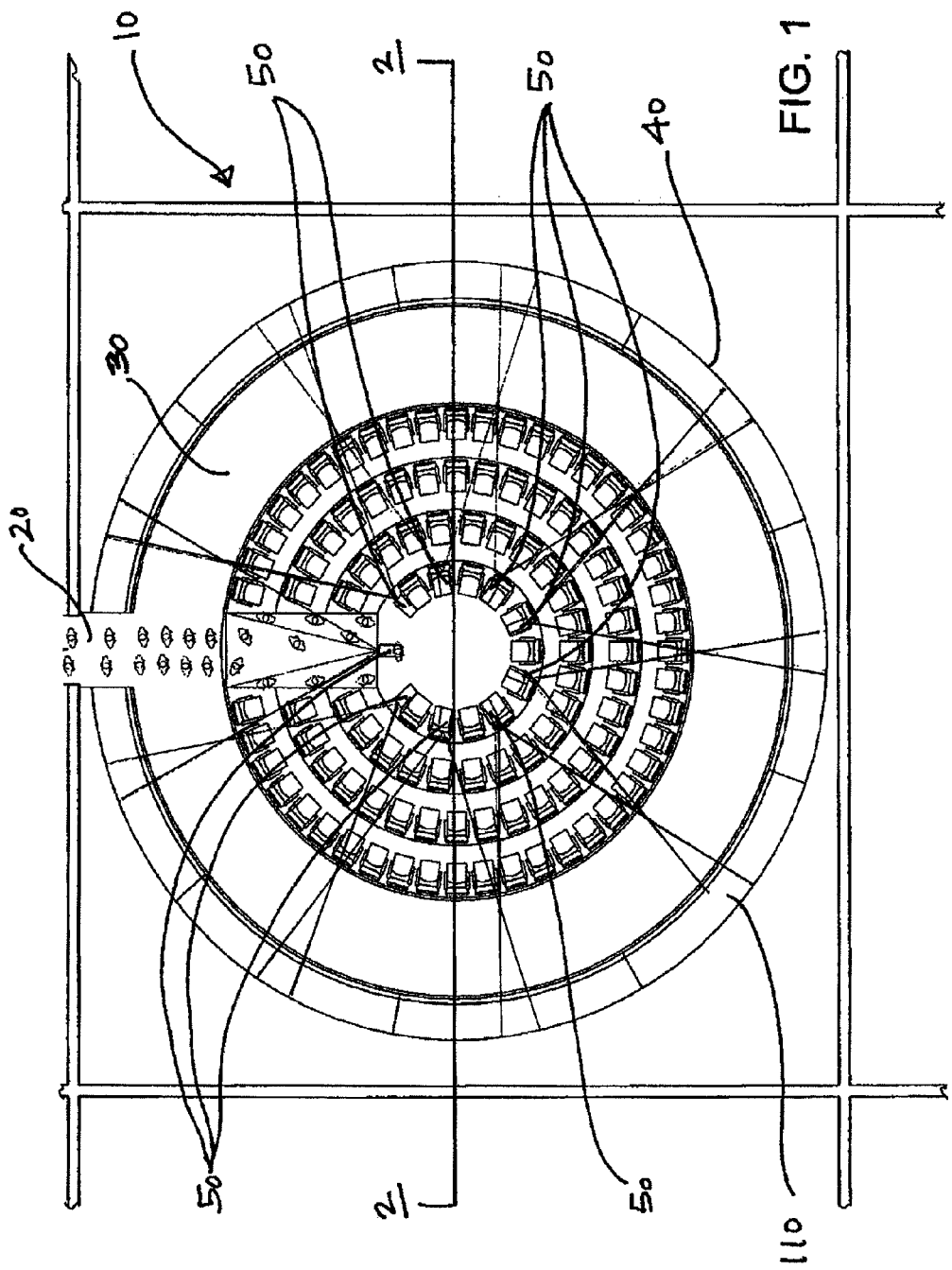
FIG. 1 is a plan view of a motion base theater having a curved compound stationary screen.

Turning now to the drawings, FIG. 1 illustrates a motion base theater 10, having a 360° compound curved screen 40, a combined entrance/exit 20, and a floor 30. The exterior walls 12 of the structure form a rectangular shape in this embodiment. The exterior of the theater may be formed in any shape, including circular and polygonal. The projection overlap 110 may be approximately 5-30% to create a seamless, edge-blended projection image or images.

Figure 2:
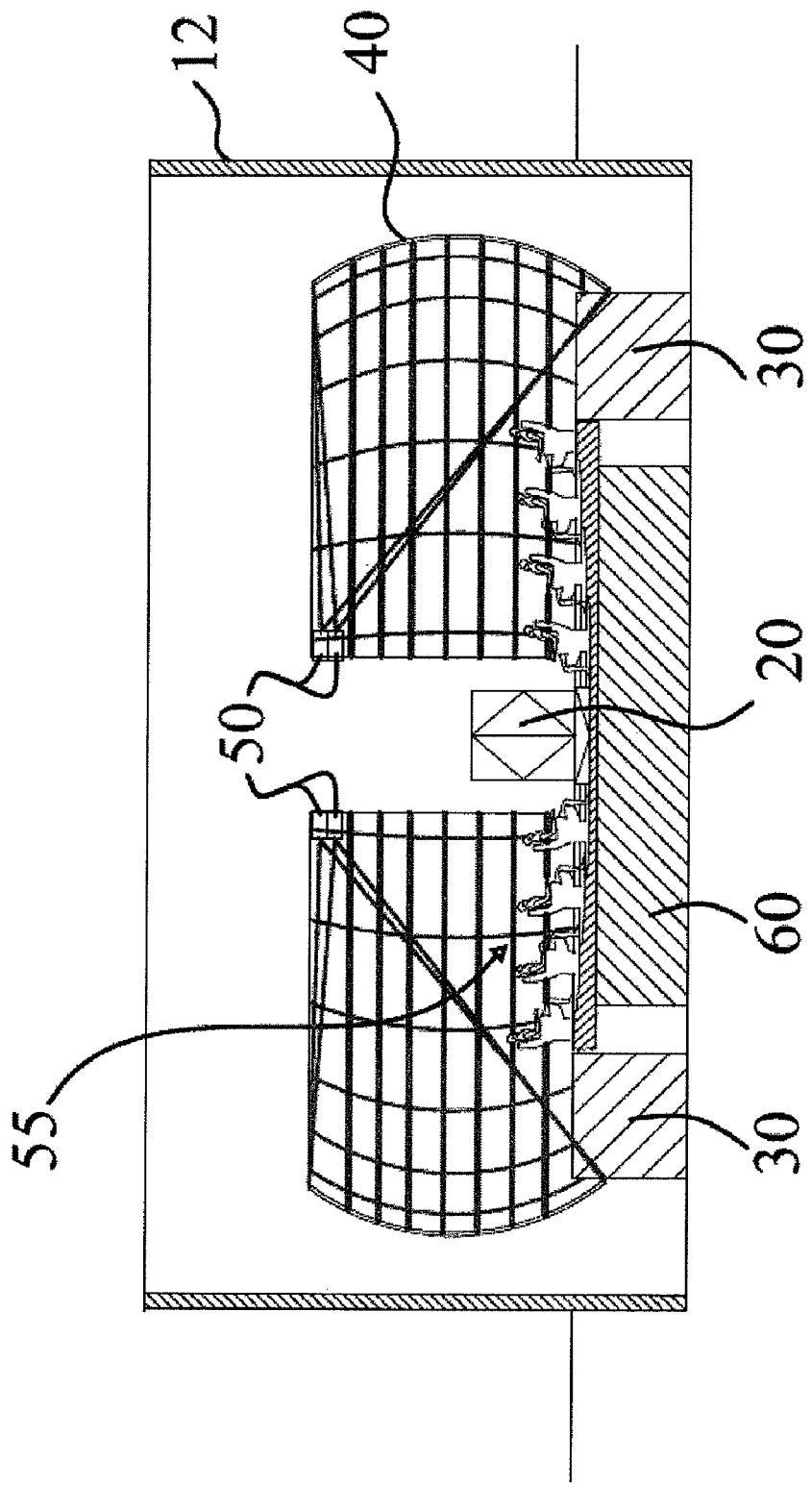
FIG. 2 is a section view taken along line 2-2 of FIG. 1 and showing the theater in the show position.
Figure 3:
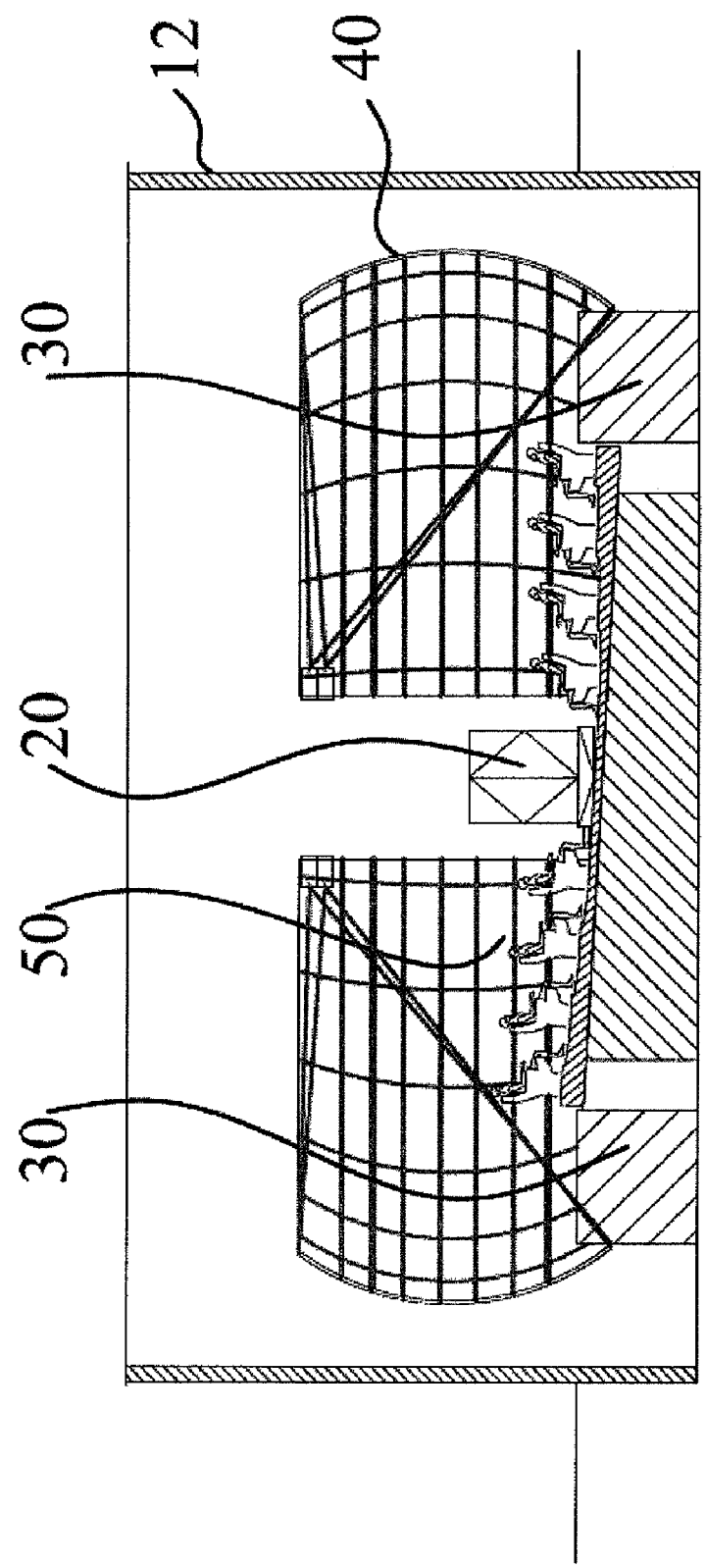
FIG. 3 is a section view taken along line 2-2 of FIG. 1 and showing movement of the seats on the motion base.

As shown in FIGS. 2-3, the seating 55 may be arranged on a motion base 60, and projectors 50 may be mounted at various locations within the theater. The motion base 60 may be tilted, rolled, or pitched during the media presentation, as shown in FIG. 2.

Figure 4:
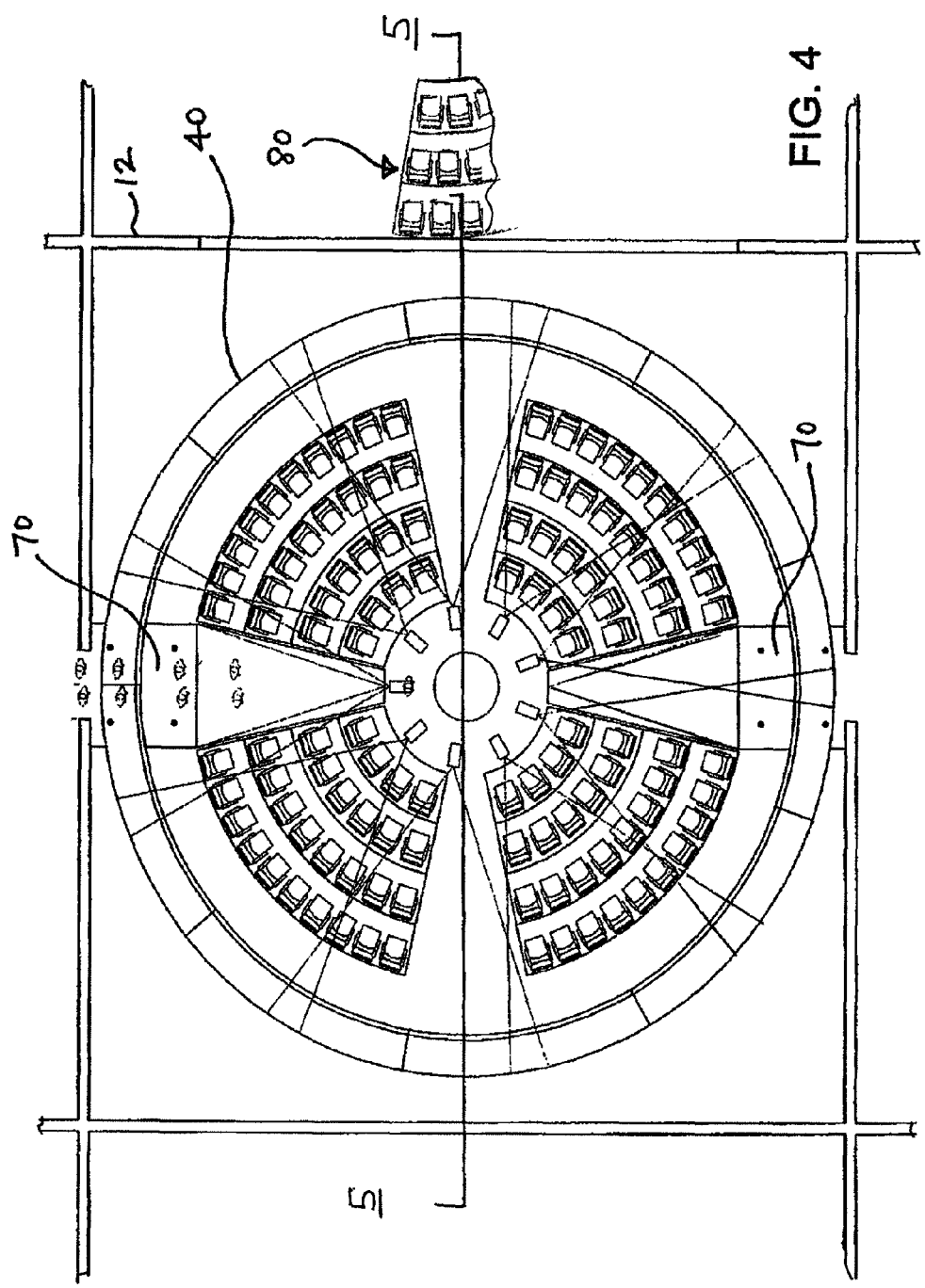
FIGS. 4-6 show a second embodiment of a motion base theater having a compound curved screen and modular tracking seating. The screen is vertically moveable from a loading/unloading position, where the screen is above the seats, to a show position, where the screen surrounds the seats. The seats are provided on modules which move into and out of the theater. The seating modules may be provided in sector shapes, as shown in FIG. 4.
Figure 5:
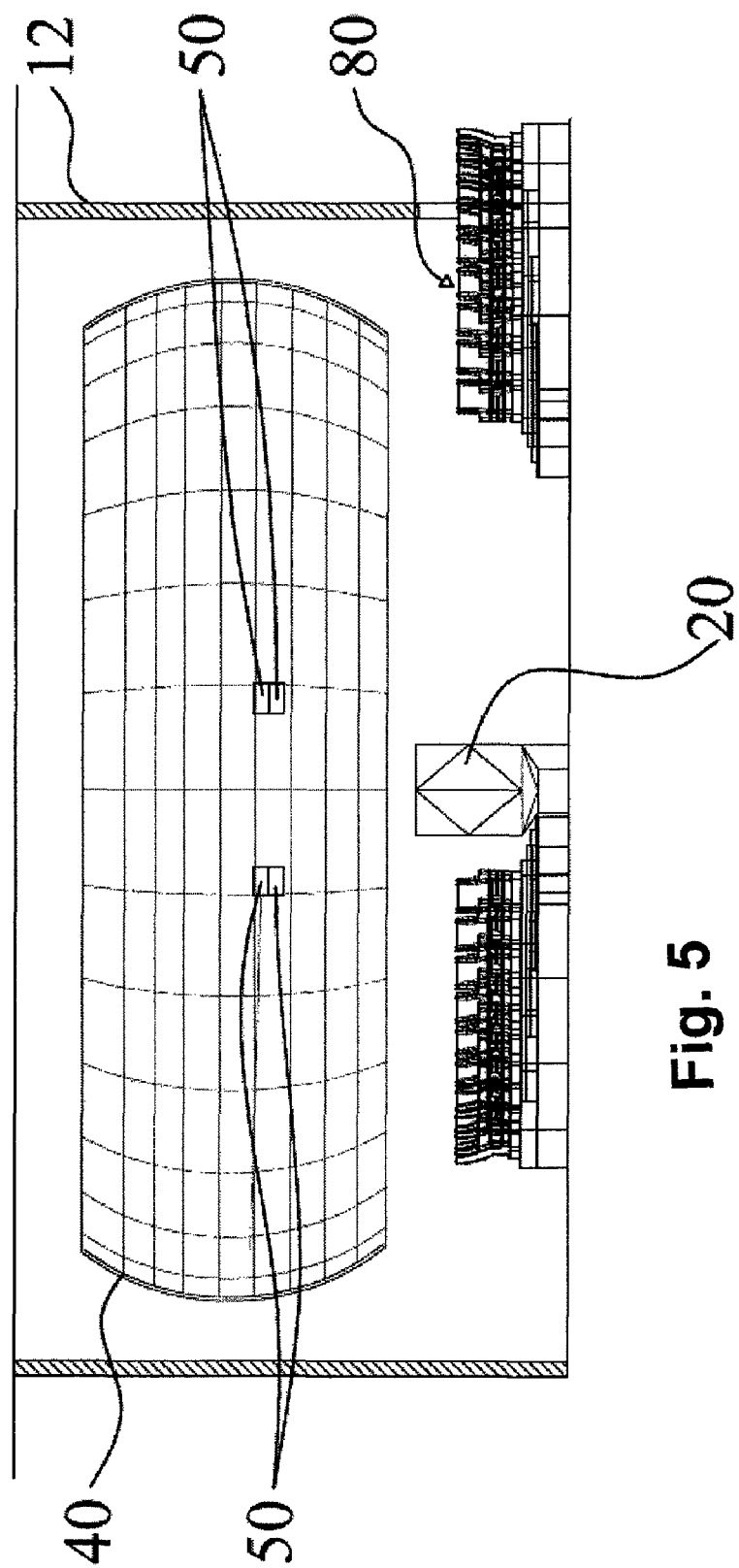
Figure 6:
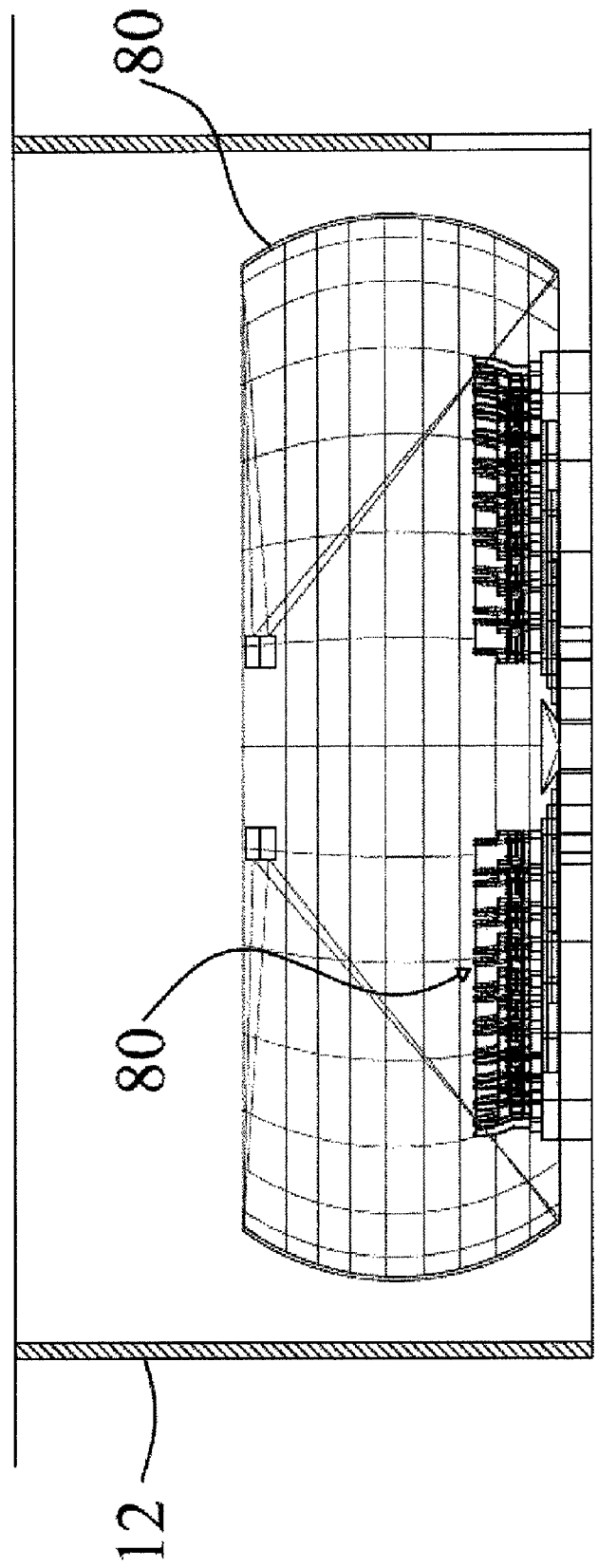

In another embodiment shown in FIGS. 4-6, seat modules 80 may move on tracks into and out of the theater. A scissor lift 70 may optionally be used at the entrance 22 or exit 24 to allow the audience to walk in or out of the theater. As shown in FIGS. 5-6, the compound curved screen 40 may be hidden in a ceiling mount and lowered at the appropriate time into position around the motion base platform.

Figure 7:
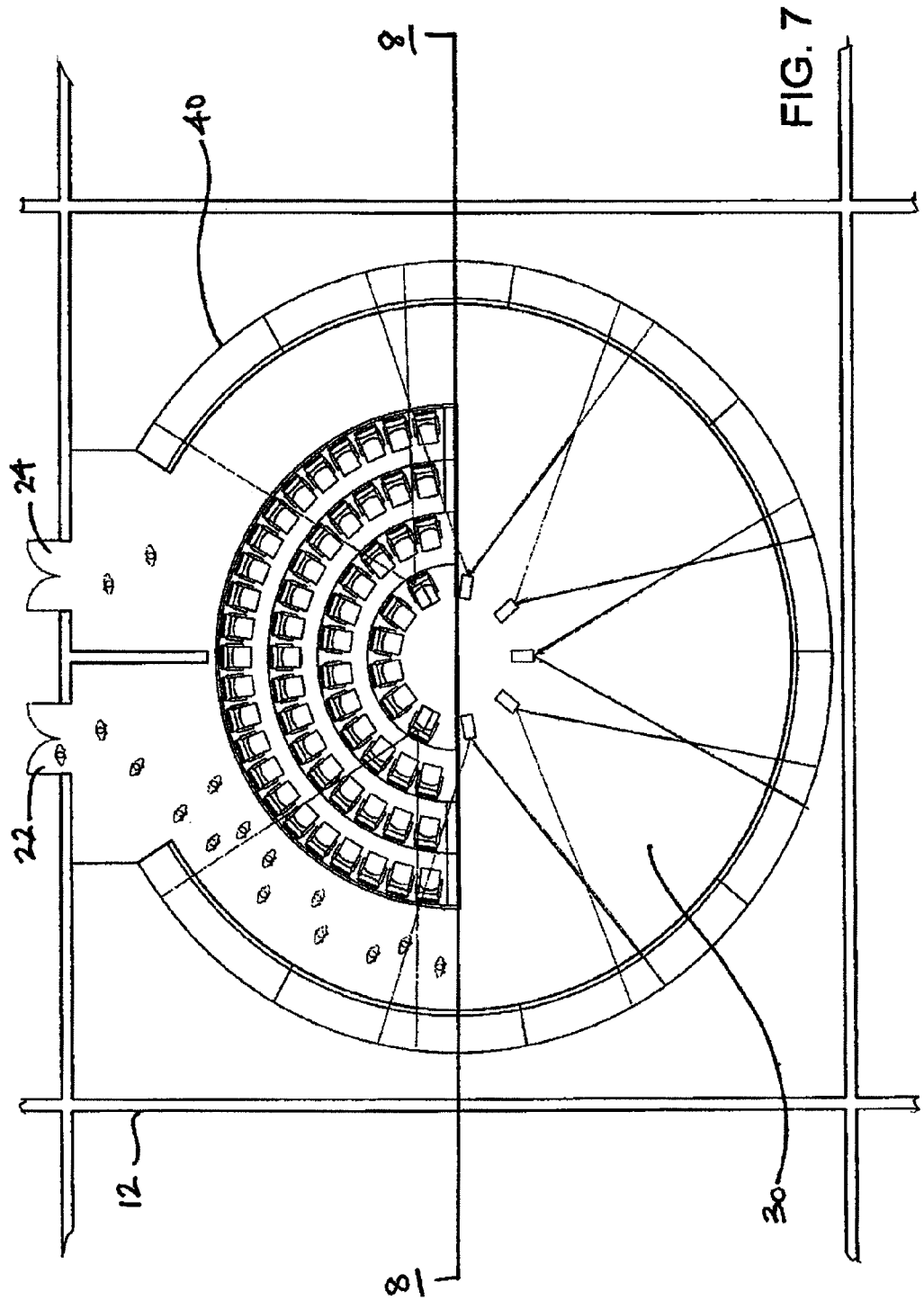
FIGS. 7-9 show a third embodiment of a motion base theater, with seating provided only on one side of a center line of the theater. The seats face inwardly.
Figure 8:
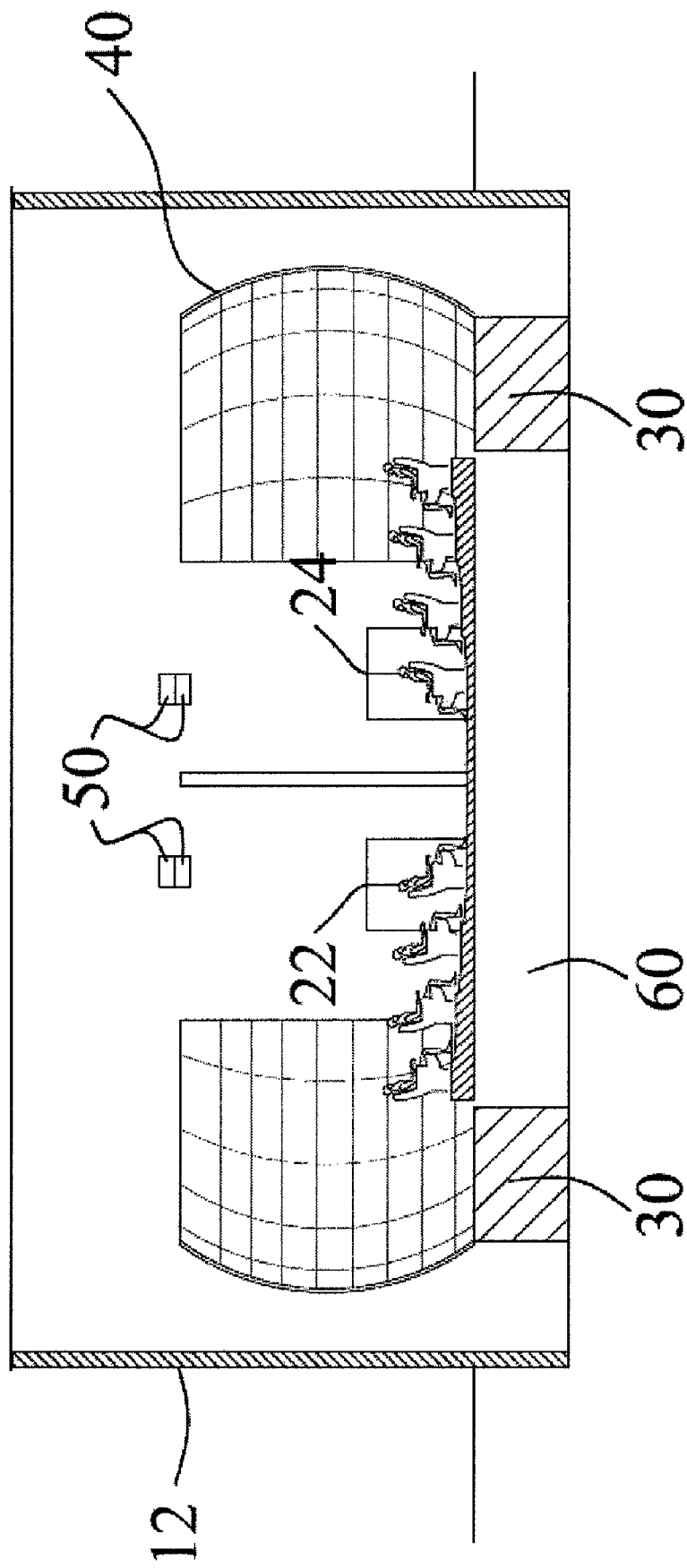
Figure 9:
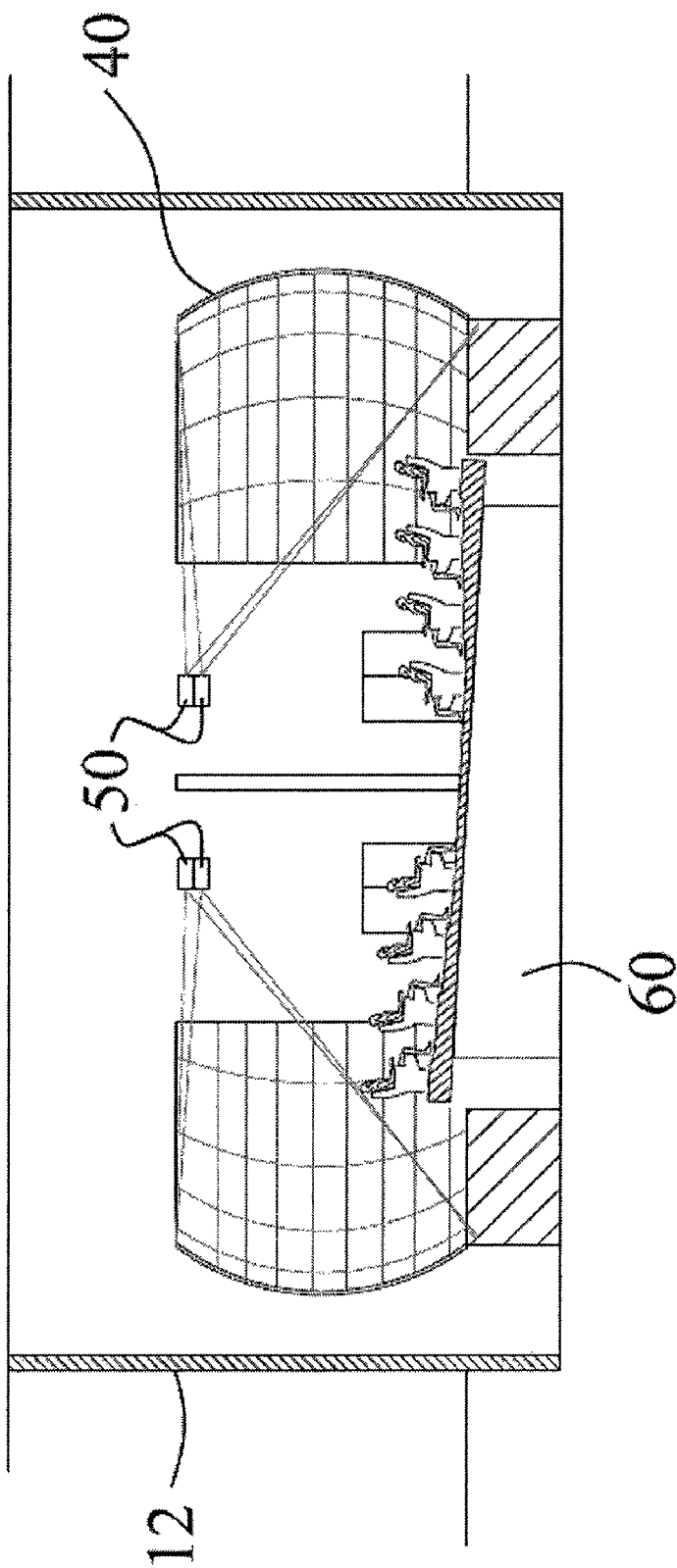

In another embodiment, as shown in FIGS. 7-9, seating may be provided only on one side of a center line of the theater, facing inwards. A separate entrance 22 and exit 24 may be provided adjacent to one another.

Figure 10:
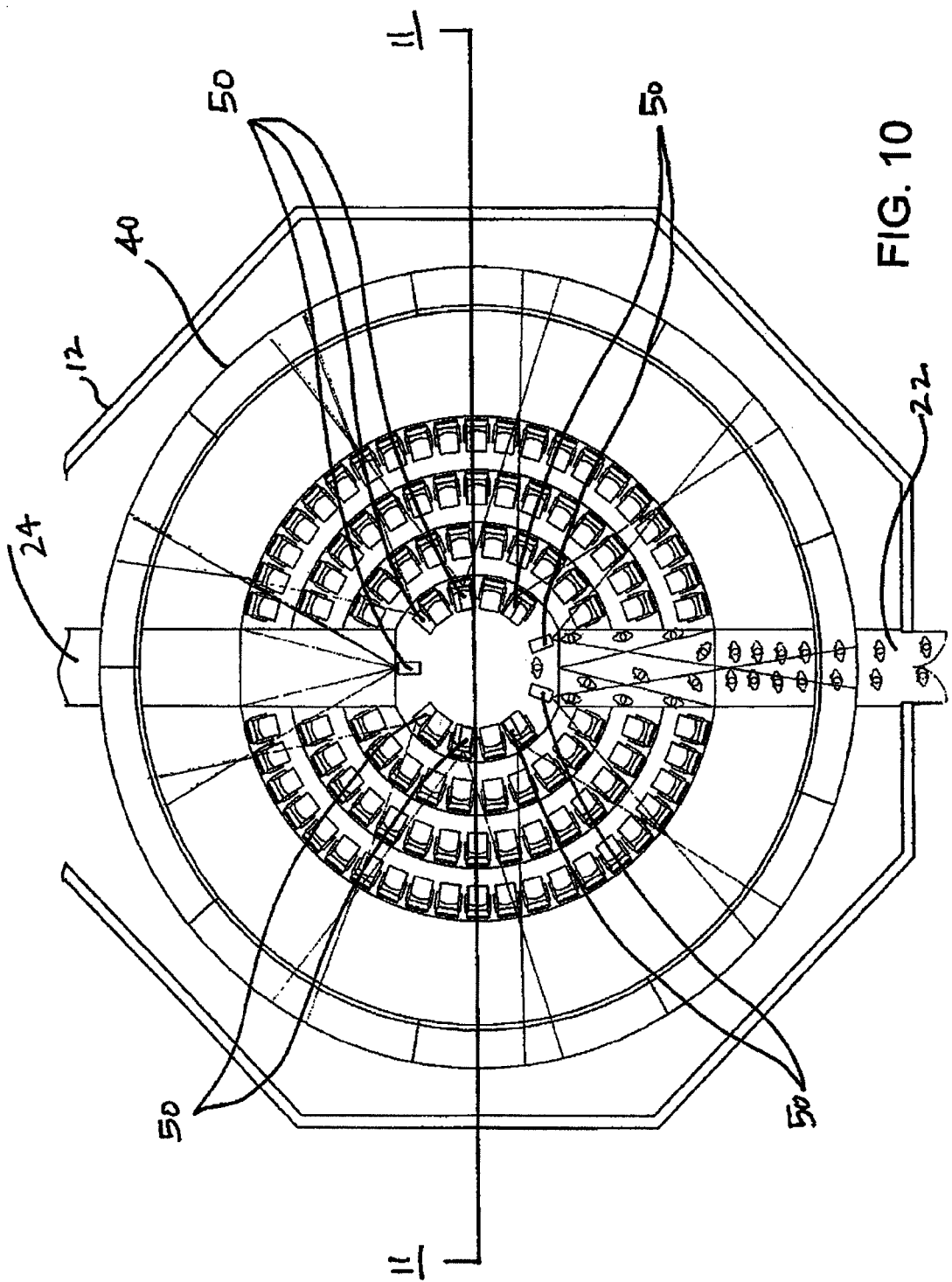

In another embodiment, as shown in FIGS. 10-12, a separate entrance 22 and exit 24 may be provided opposite each other. The tiers of seats may be arranged at graduated heights.

In another embodiment, as shown in FIGS. 13-15, the seating may be arranged in outwardly facing concentric rows.

In another embodiment, as shown in FIGS. 16-18, the theater may have a dome-shaped screen 100 which may be raised and lowered around the audience at the appropriate times.

Figure 19:
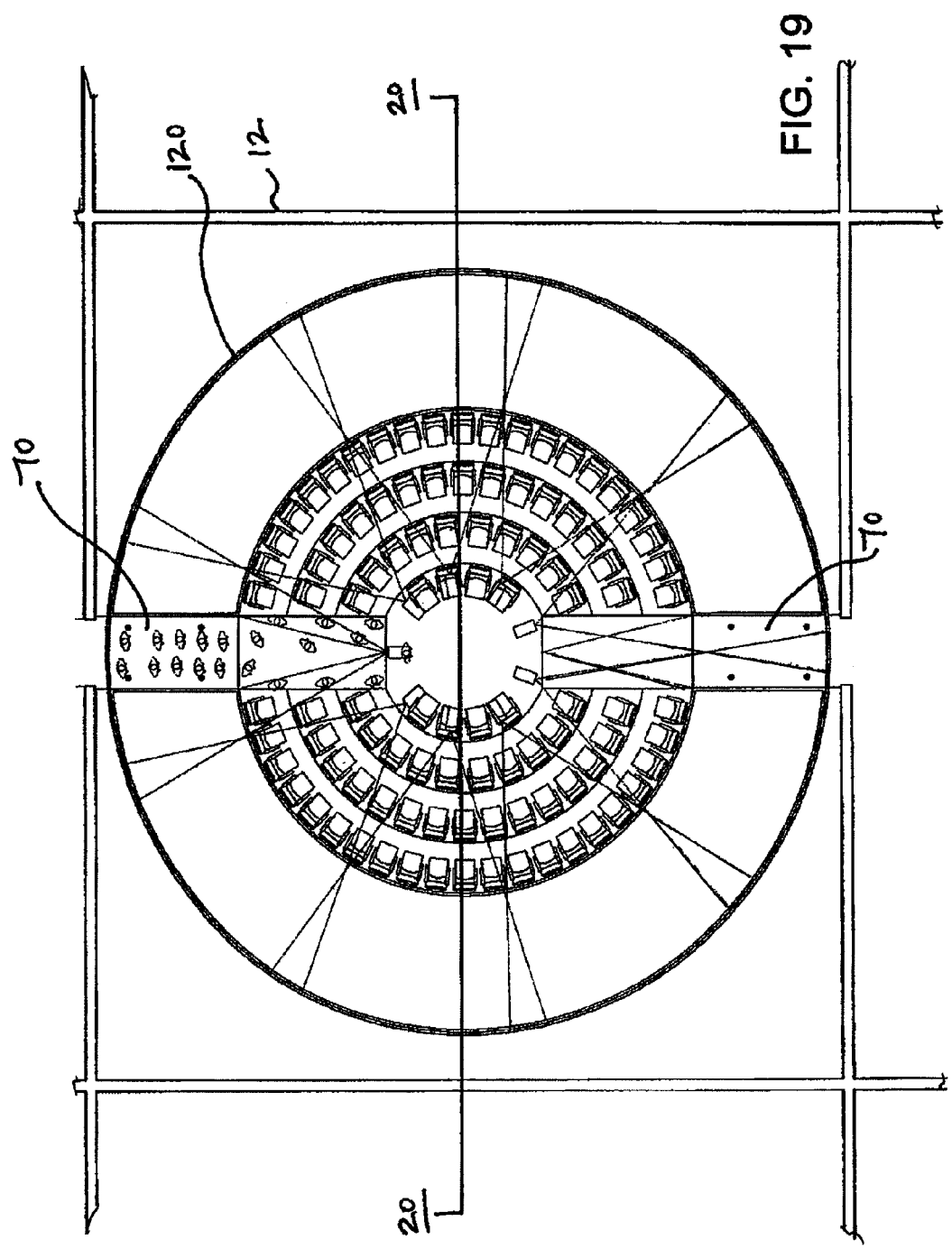

In another embodiment, as shown in FIGS. 19-21, the theater may have a 360° cylindrical screen 120 which may be raised and lowered around the audience at the appropriate times.

Figure 22:
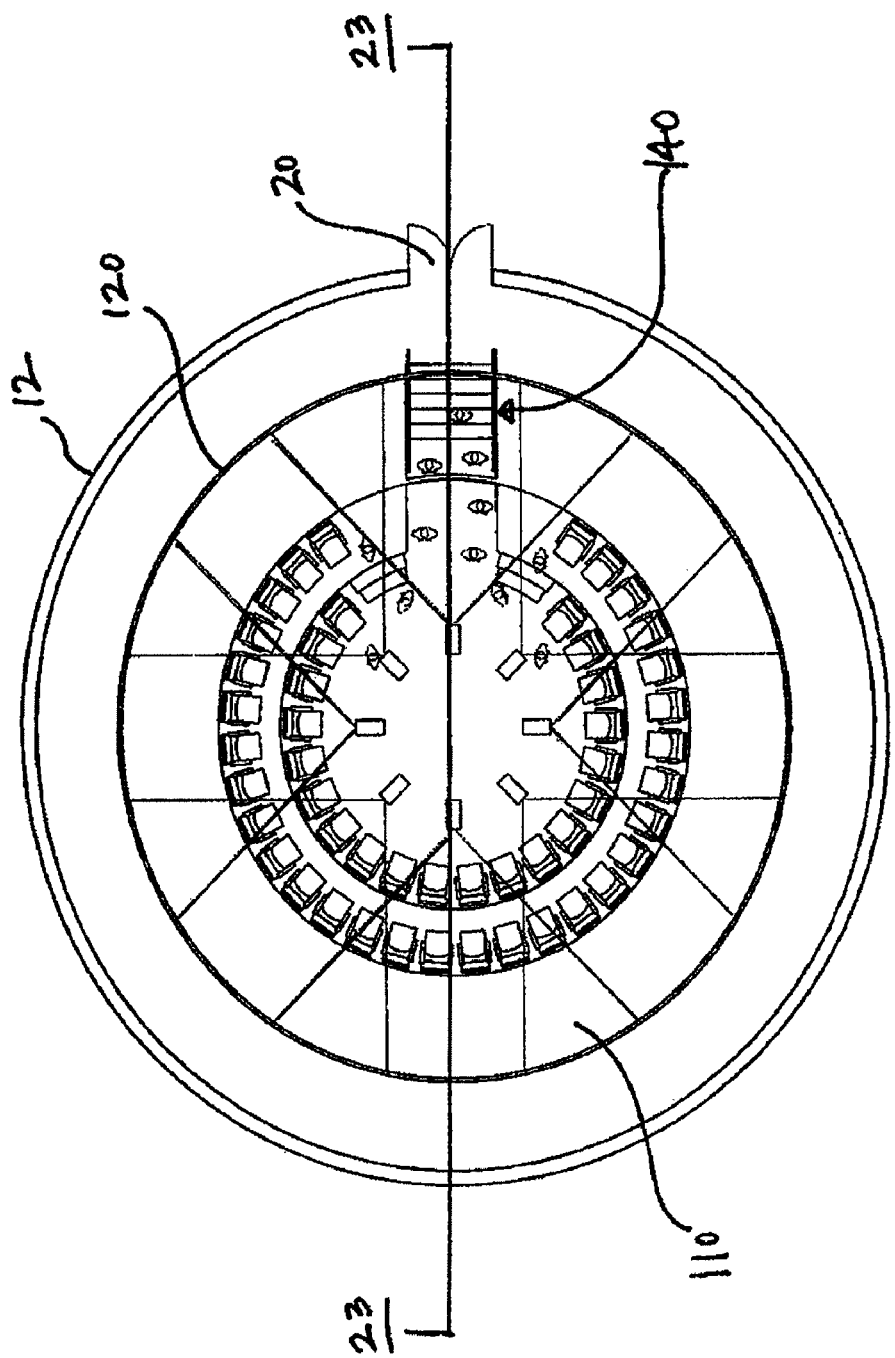
FIGS. 22-24 show an eighth embodiment of a motion base theater having a cylinder screen, a reduced number of seats, and a stairway leading to the seating platform.
Figure 23:
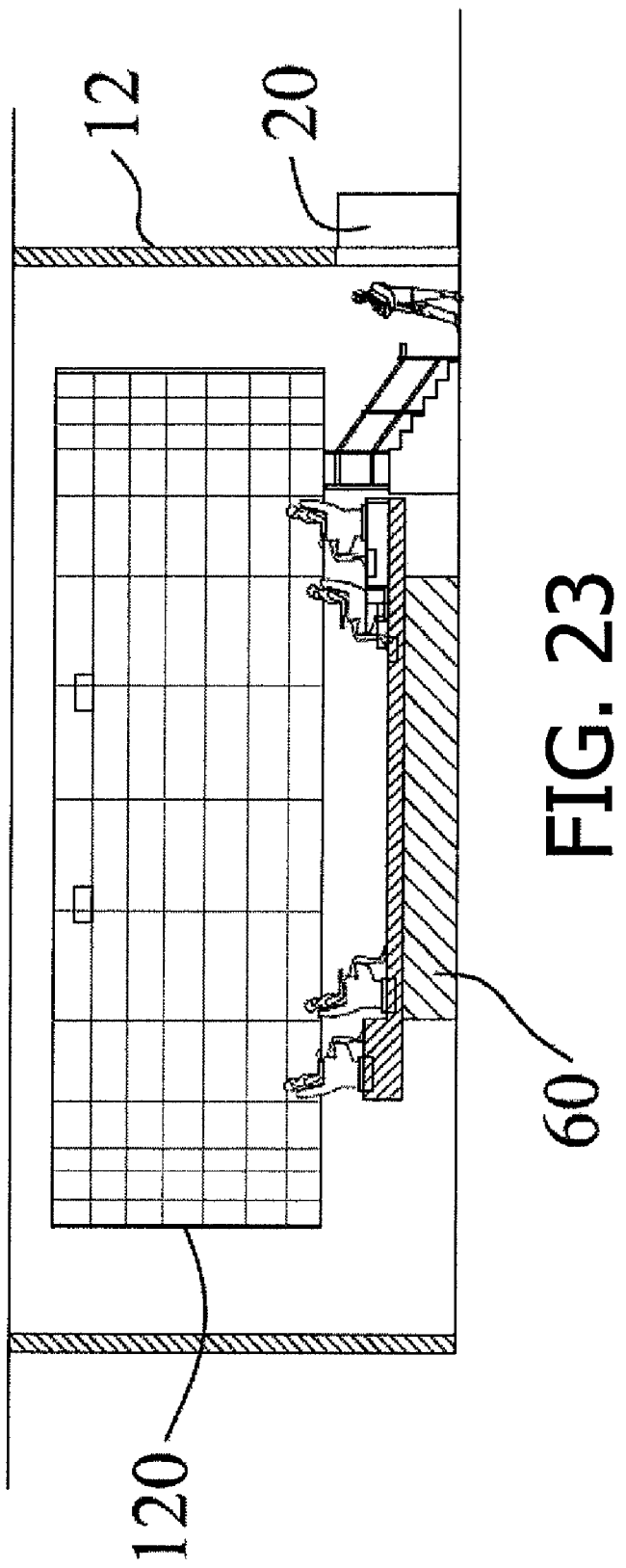
Figure 24:
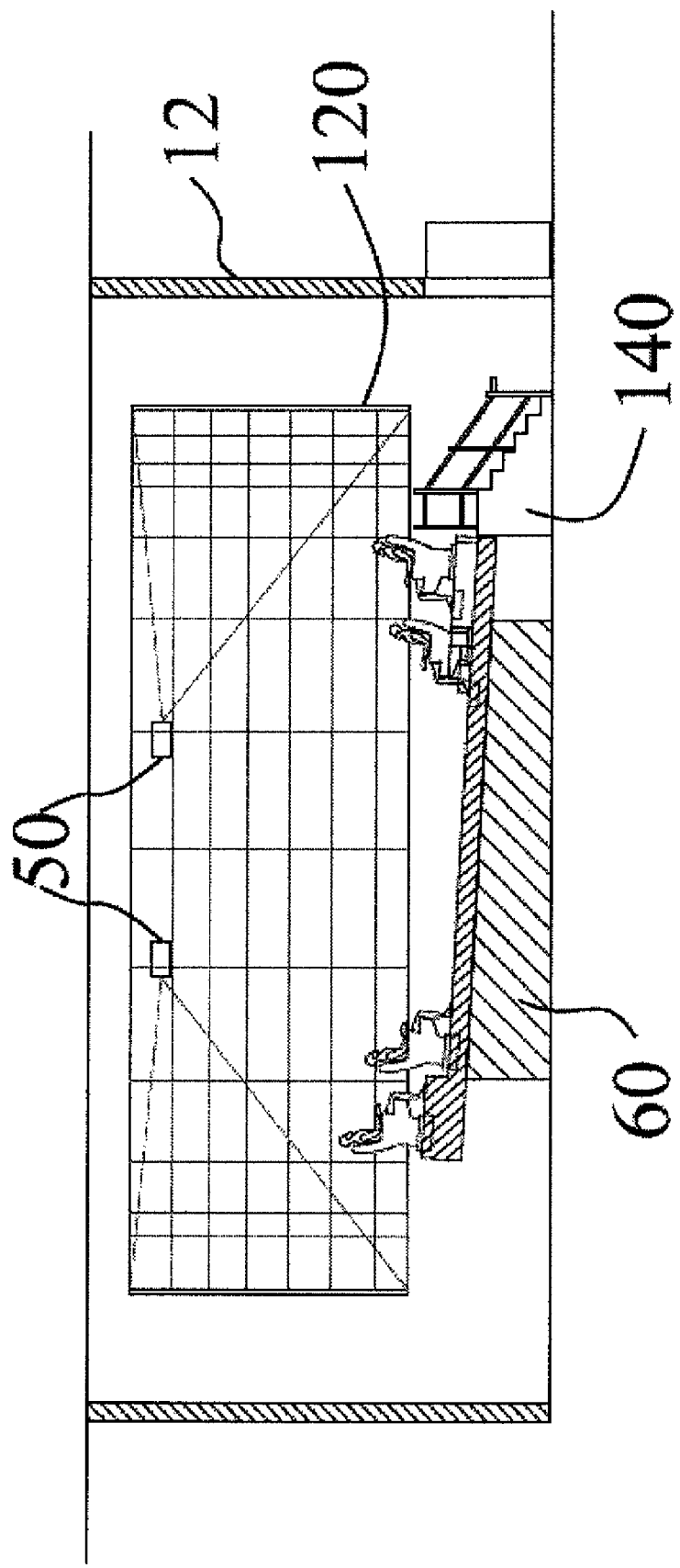

In another embodiment, as shown in FIGS. 22-24, a staircase may be used at the combined entrance/exit 20 to facilitate ingress and egress of audience members. As shown in FIG. 22, the projection overlap 110 may be approximately 25%.

Figure 25:
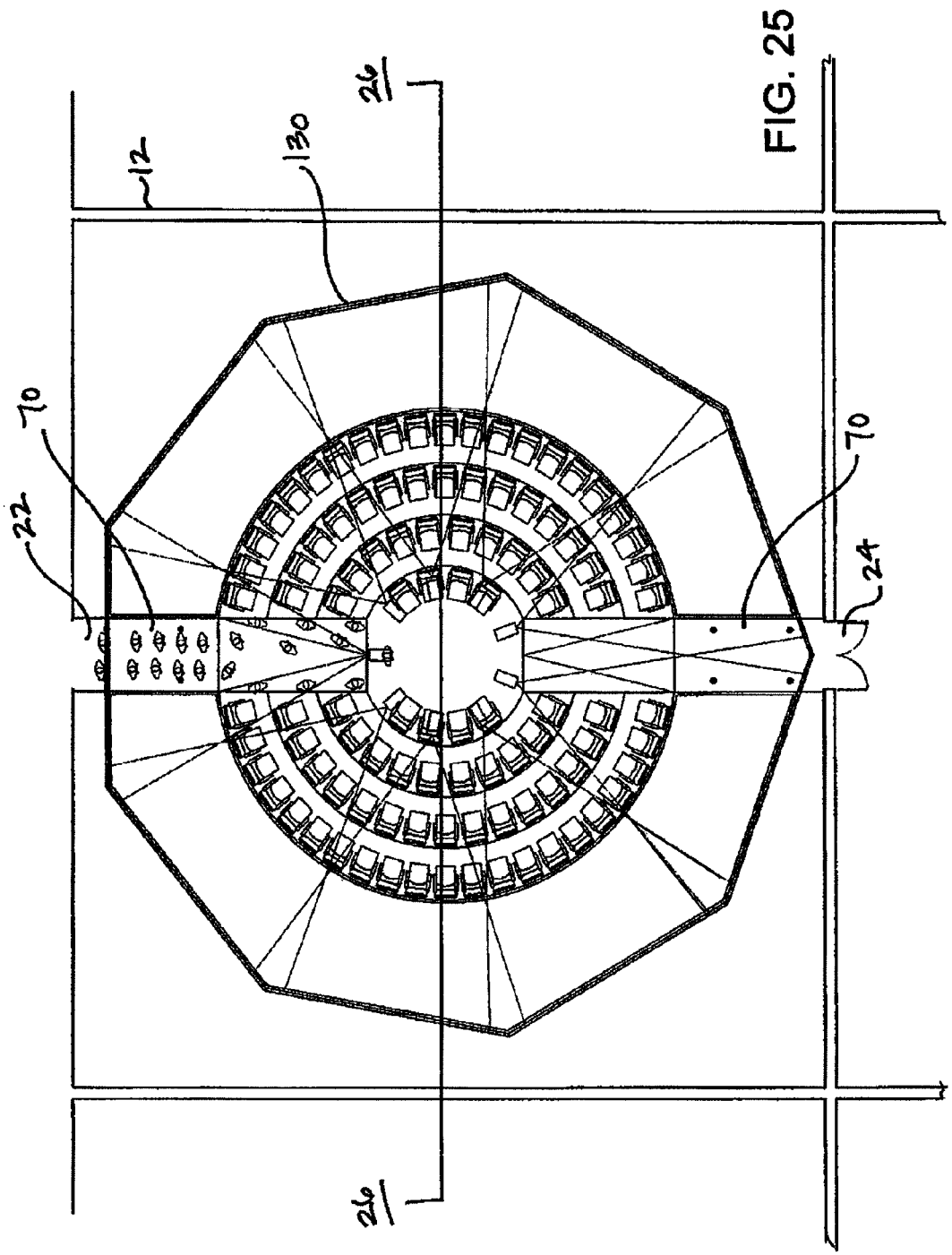

In another embodiment, as shown in FIGS. 25-27, the motion base theater 10 may have a polygonal interior shape and a flat projection screen 130 divided into segments.

Figure 28:
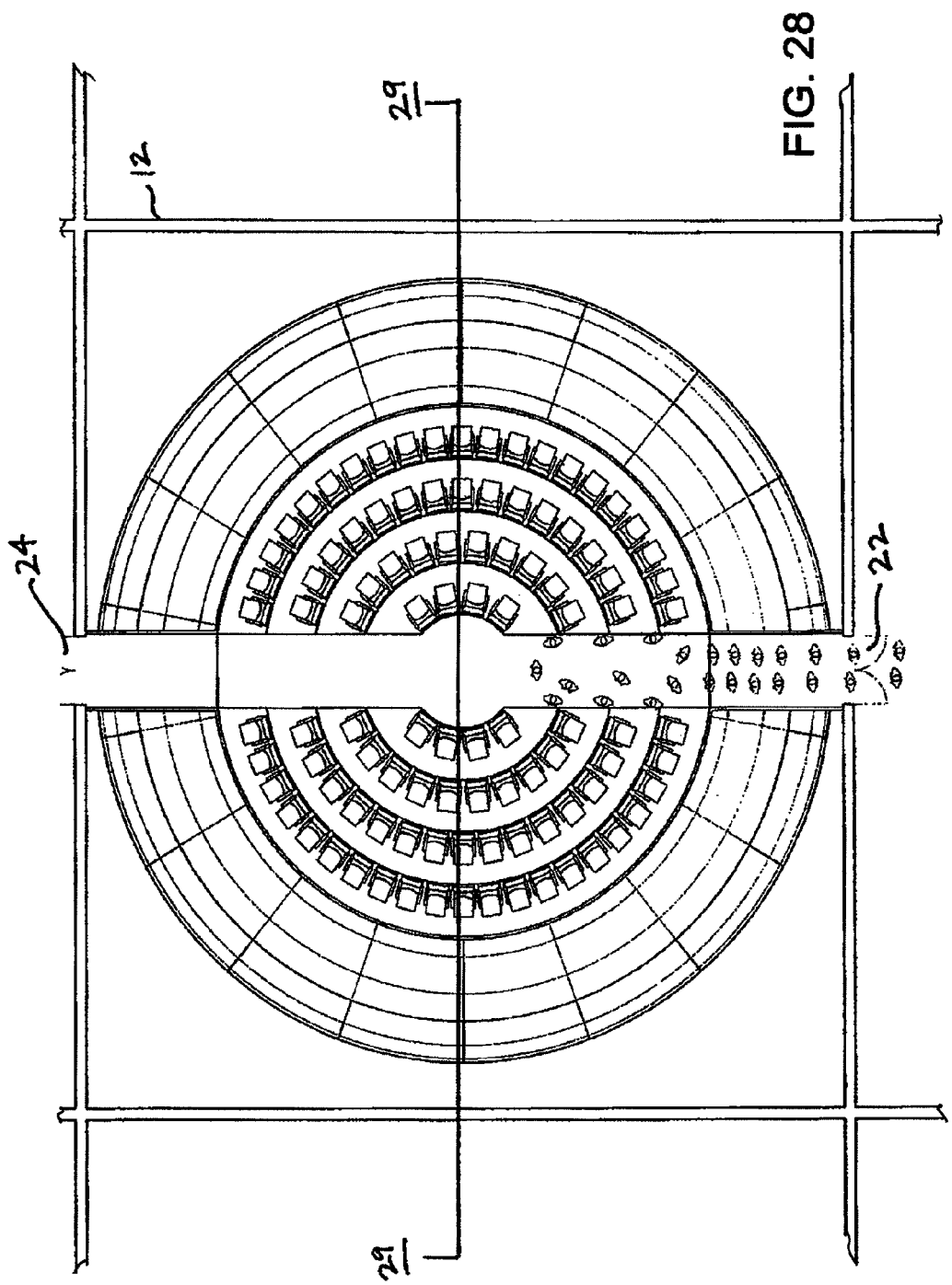
FIGS. 28-30 show a tenth embodiment of a motion base theater having a seating arrangement whereby the audience first takes their seats and is then lowered into the theater.
Figure 29:
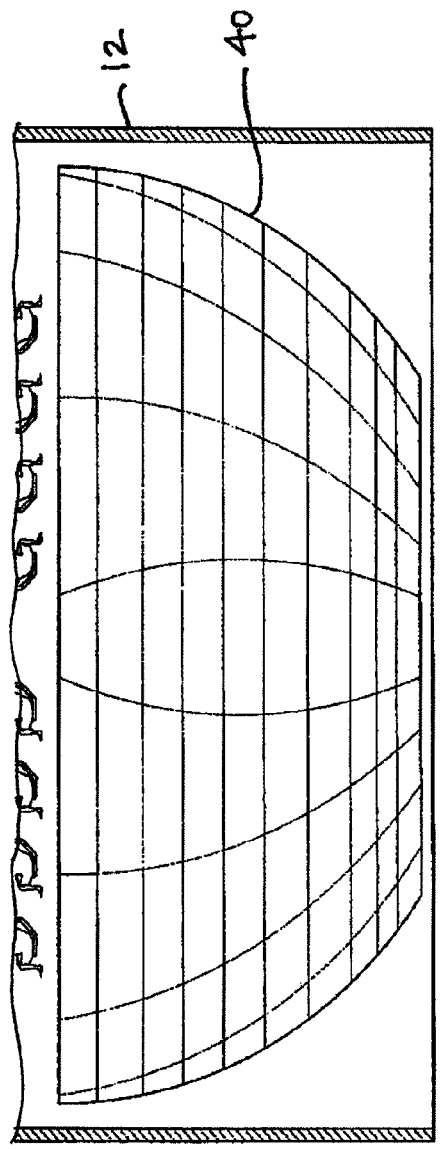
Figure 30:
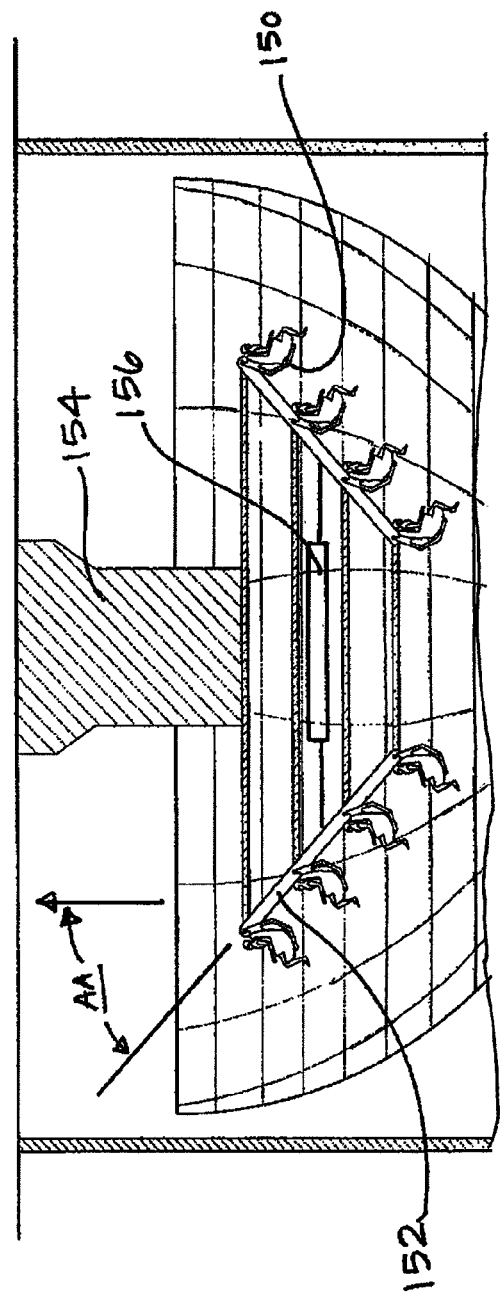

In another embodiment, as shown in FIGS. 28-30, the audience may be seated in suspended seats 150 and lowered into the theater at the appropriate time. The suspended seats 150 may be rigidly or pivotably attached to a seat frame 152. The seat frame may optionally rotate on an axle 154 to impart centrifugal force on the audience. If the seats 150 are rigidly attached to the seat frame 152, the angle AA of frame side members 154 may be selectively varied by an actuator 156. As the angle AA of the frame side members decreases, the seats are tilted slightly up. This forces the audience further back into the seat, creating the physical sensation of acceleration, without any actual movement. Conversely, as the actuator 156 moves the frame side members to increase the angle AA, the seats are tilted slightly downwardly. This forces the audience towards the front of the seat, creating the physical sensation of braking or deceleration. The suspended seats may alternatively be in a fixed vertical position, with the screen moving up or down into a position surrounding the seats.

While several embodiments have been shown and described, various changes and substitutions may of course be made, without departing from the spirit and scope of the invention. The invention, therefore, should not be limited, except by any claims and their equivalents.

The invention claimed is:

1. A method comprising:
   seating persons in a theater on seats supported on a motion base;
   surrounding the seats with a dome screen, and with the seats arranged in a plurality of curved rows facing inwardly towards a center location of the theater;
   projecting moving images onto the screen from multiple projectors;
   edge blending the moving images projected by the multiple projectors, on the continuous circular screen, to provide a seamless projected moving image on the screen;
   playing a sound track in the theater in synchronization with the projected images; and moving the seats rigidly supported on the motion base with at least tilt and pitch movements in synchronization with the projected moving images.

2. The method of claim 1 further comprising moving the screen vertically between a raised position and a lowered position.

3. The method of claim 1 further comprising moving the motion base with tilt, pitch and roll movements.

4. The method of claim 1 further comprising projecting the moving images radially outwardly onto the screen from a location adjacent to the center location.

5. The method of claim 1 further comprising providing at least some of the seats with one or more of scent, neck blast, wind blast, leg tickler and seat rumble effects.

6. The method of claim 1 further comprising arranging the seats on multiple vertically staggered tiers, with the vertical level of the seats decreasing towards a central area of the theater.

7. The method of claim 1 wherein the projected images are 3D images.

8. The method of claim 1 further comprising projecting the moving images radially outward from a central area of the theater.

9. The method of claim 1 further comprising projecting substantially seamless edge blended 3D images onto the curved screens with an overlap of 5-30%.

10. A theater operation method comprising:
seating persons in a theater on seats supported on a motion base, with the seats on multiple vertically staggered circular tiers, and with the tiers decreasing towards a central area of the theater;
positioning a dome screen entirely around the tiers of seats, and with the seats on the tiers arranged in curved rows facing inwardly towards a center location of the theater;
projecting moving images onto the screen from multiple projectors located adjacent to the central area of the theater;
edge blending the moving images projected by the multiple projectors, on the continuous circular screen, to provide a seamless projected moving image on all areas of the screen;
playing a sound track in the theater in synchronization with the projected images;
moving the motion base with tilt, pitch and roll movements in synchronization with the projected moving images; and
providing at least some of the seats with one or more of scent, neck blast, wind blast, leg tickler and seat rumble effects.

11. The method of claim 10 further comprising moving the screen Vertically between a raised position and a lowered position.

12. The method of claim 10 wherein the projected images are 3D images.

13. The method of claim 10 further comprising projecting substantially seamless edge blended 3D images onto the curved screens with an overlap of 5-30%.

14. A method comprising:
seating persons in a theater on seats rigidly attached to a circular motion base platform;
surrounding the seats with a continuous dome screen, and with the seats arranged in a plurality of curved rows facing inwardly towards a center location of the theater; with the curved rows of seats on multiple vertically staggered tiers, with the vertical level Of the seats decreasing towards the central location-of the theater;
projecting moving images onto the screen from multiple projectors;
edge blending the moving images projected by the multiple projectors, on the continuous dome screen, to provide a seamless projected moving image on substantially the entire dome screen;
playing a sound track in the theater in synchronization with the projected images; and
moving the circular motion base platform with at least tilt and pitch movements in synchronization with the projected moving images.

* * * * *